US012075203B2

(12) United States Patent
Hwang et al.

(10) Patent No.: US 12,075,203 B2
(45) Date of Patent: Aug. 27, 2024

(54) SPEAKER ASSEMBLY AND DISPLAY DEVICE HAVING THE SAME

(71) Applicant: LG ELECTRONICS INC., Seoul (KR)

(72) Inventors: Sungphil Hwang, Seoul (KR); Yongjun Je, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 151 days.

(21) Appl. No.: 17/845,540

(22) Filed: Jun. 21, 2022

(65) Prior Publication Data

US 2022/0417628 A1 Dec. 29, 2022

(30) Foreign Application Priority Data

Jun. 24, 2021 (KR) ........................ 10-2021-0082311

(51) Int. Cl.
*H04R 1/02* (2006.01)
*H04R 1/24* (2006.01)

(52) U.S. Cl.
CPC ............. *H04R 1/025* (2013.01); *H04R 1/028* (2013.01); *H04R 1/24* (2013.01); *H04R 2400/11* (2013.01); *H04R 2499/15* (2013.01)

(58) Field of Classification Search
CPC .......... H04R 1/025; H04R 1/028; H04R 1/24; H04R 2400/11; H04R 2499/15
USPC .......................................................... 381/333
See application file for complete search history.

(56) References Cited

U.S. PATENT DOCUMENTS

2017/0164080 A1* 6/2017 Chung .................. H04R 1/028

FOREIGN PATENT DOCUMENTS

| | | |
|---|---|---|
| KR | 100371384 | 2/2003 |
| KR | 100962595 | 6/2010 |
| KR | 101275209 | 6/2013 |
| KR | 1020140141400 | 12/2014 |
| KR | 1020170067295 | 6/2017 |

OTHER PUBLICATIONS

PCT International Application No. PCT/KR2021/008895, Search Report dated Mar. 17, 2022, 3 pages.

* cited by examiner

*Primary Examiner* — Paul Kim
(74) *Attorney, Agent, or Firm* — LEE, HONG, DEGERMAN, KANG & WAIMEY

(57) ABSTRACT

Disclosed is a speaker assembly. The speaker of the present disclosure may include a first housing in which a first speaker is mounted; a second housing in which a second speaker is mounted, and which is adjacent to the first housing; and a plate which protrudes from the first housing toward the second housing, and to which the second housing is movably coupled, wherein a portion of the plate may be bent between the first housing and the second housing, when the second housing moves away from the first housing.

14 Claims, 15 Drawing Sheets

1

SPEAKER ASSEMBLY AND DISPLAY DEVICE HAVING THE SAME

CROSS-REFERENCE TO RELATED APPLICATION

Pursuant to 35 U.S.C. § 119(a), this application claims the benefit of earlier filing date and right of priority to Korean Patent Application No. 10-2021-0082311, filed on Jun. 24, 2021, the contents of which are hereby incorporated by reference herein in its entirety.

BACKGROUND OF THE INVENTION

1. Field of the Invention

The present disclosure relates to a speaker assembly and a display device having the same.

2. Description of the Related Art

As the information society develops, the demand for display devices is also increasing in various forms. In correspondence with this, various display devices such as Liquid Crystal Display Device (LCD), Plasma Display Panel (PDP), Electro luminescent Display (ELD), Vacuum Fluorescent Display (VFD), and Organic Light Emitting Diode (OLED) have been researched and used in recent years.

Among them, an LCD panel includes a TFT substrate and a color substrate that face each other with a liquid crystal layer interposed therebetween, and may display an image by using light provided from a backlight unit. In addition, an OLED panel may display an image by depositing an organic material layer capable of emitting light by itself on a substrate on which a transparent electrode is formed. In particular, since a display device having an OLED panel does not require a backlight unit, there is an advantage of being implemented in an ultra-thin shape. In addition, a flexible OLED panel can be bent or unfolded.

Meanwhile, a speaker assembly is a device that converts an electric sound signal into a sound wave and outputs it, and may be used alone or connected to various devices such as a display device and an electronic device. The speaker assembly may be subdivided into a woofer, a midrange, a tweeter, or the like according to a sound range.

Recently, a lot of researches have been accomplished on a speaker assembly that conforms to a curved or bendable display structure and can provide users with high sound quality.

SUMMARY OF THE INVENTION

The present disclosure has been made in view of the above problems, and provides a speaker assembly that is convertible from a flat shape to a bent shape.

The present disclosure further provides a speaker assembly capable of improving the reproduction range of a speaker by increasing the volume of the speaker in a bent shape.

The present disclosure further provides a display device capable of providing a user with a strong sense of screen immersion through a bent display panel, and providing a user with an improved sense of presence and high-quality sound through a bent speaker assembly.

In accordance with an aspect of the present disclosure, a speaker assembly may include: a first housing in which a first speaker is mounted; a second housing in which a second speaker is mounted, and which is adjacent to the first housing; and a plate which protrudes from the first housing toward the second housing, and to which the second housing is movably coupled, wherein a portion of the plate may be bent between the first housing and the second housing, when the second housing moves away from the first housing.

In accordance with another aspect of the present disclosure, a display device may includes: a display panel; a frame to which the display panel is coupled; a left speaker assembly which is adjacent to a left side of the frame, and coupled to the frame; and a right speaker assembly which is adjacent to a right side of the frame, and coupled to the frame, wherein each of the left speaker assembly and the right speaker assembly may include: a first housing in which a first speaker is mounted; a second housing in which a second speaker is mounted, and which is adjacent to the first housing; and a plate which protrudes from the first housing toward the second housing, and to which the second housing is movably coupled, wherein the display panel and the frame may be flexible, and wherein a portion of the plate may be bent between the first housing and the second housing, when the second housing moves away from the first housing.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION OF THE PREFERRED EMBODIMENTS

Figure 1:
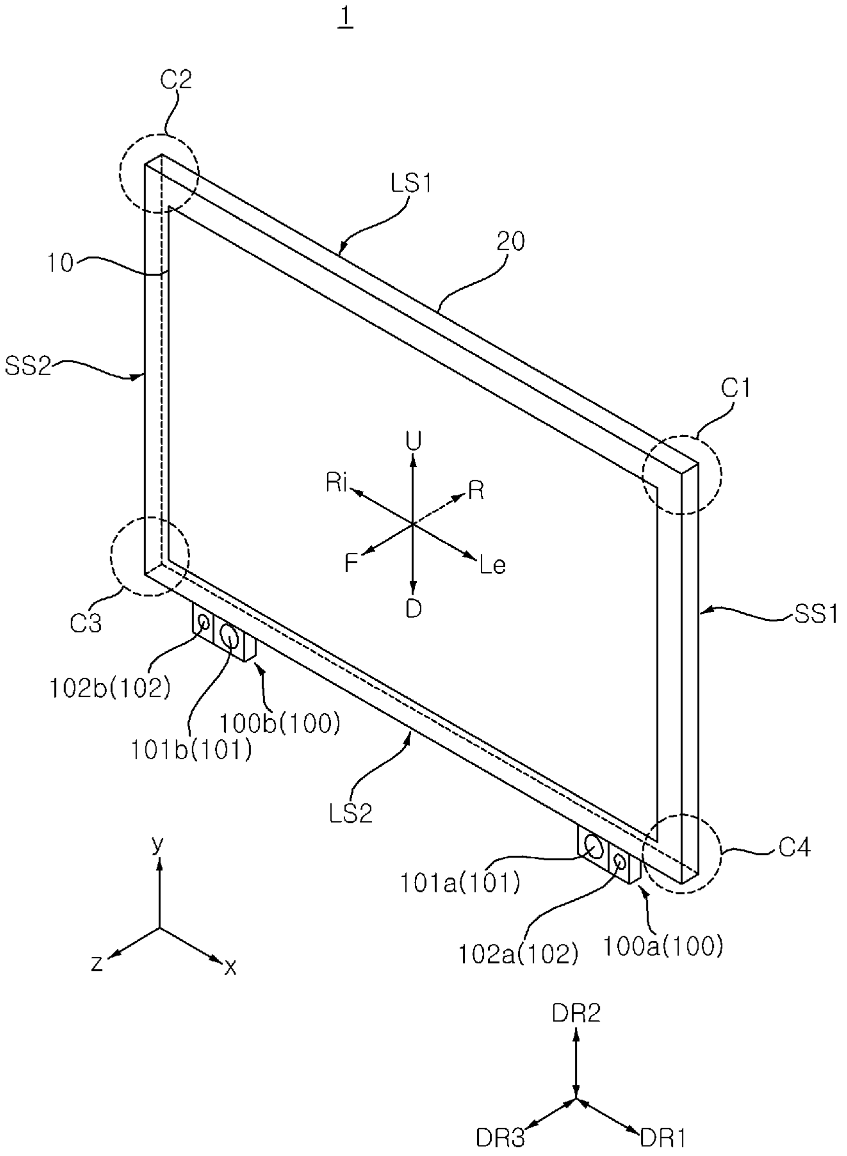
FIGS. 1 to 15 are diagrams illustrating examples of a speaker assembly and a display device having the same according to embodiments of the present disclosure.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted.

In the following description, with respect to constituent elements used in the following description, the suffixes "module" and "unit" are used or combined with each other only in consideration of ease in the preparation of the specification, and do not have or serve as different meanings.

In addition, in describing the embodiments disclosed in the present specification, if it is determined that detailed descriptions of related known technologies may obscure the gist of the embodiments disclosed in the present specification, the detailed description thereof will be omitted. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present disclosure.

Although the terms "first," "second," etc., may be used herein to describe various components, these components should not be limited by these terms. These terms are only used to distinguish one component from another component.

These terms are only used to distinguish one component from another component. When a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise.

In the following description, even if the embodiment is described with reference to a specific figure, if necessary, reference numeral not shown in the specific figure may be referred to, and the reference numeral not shown in the specific figure may be used in a case where the above reference numeral is shown in the other figures.

Referring to FIG. 1, a display device 1 may include a display panel 10. The display panel 10 may display a screen.

The display device 1 may include a first long side LS1, a second long side LS2 facing the first long side LS1, a first short side SS1 adjacent to the first long side LS1 and the second long side LS2, and a second short side SS2 facing the first short side SS1. Meanwhile, for convenience of explanation, it is illustrated and described that the lengths of the first and second long sides LS1 and LS2 are longer than the lengths of the first and second short sides SS1 and SS2, but it may also be possible that the lengths of the first and second long sides LS1 and LS2 are approximately equal to the lengths of the first and second short sides SS1 and SS2.

A direction parallel to the long side LS1, LS2 of the display device 1 may be referred to as a left-right direction or a first direction DR1. A direction parallel to the short side SS1, SS2 of the display device 1 may be referred to as an up-down direction or a second direction DR2. A direction perpendicular to the long side LS1, LS2 and the short side SS1, SS2 of the display device 1 may be referred to as a front-rear direction or a third direction DR3.

A direction in which the display panel 10 displays an image may be referred to as a forward direction (F, z), and a direction opposite to this may be referred to as a rearward direction R. The side of the first long side LS1 may be referred to as an upper side (U, y). The side of the second long side LS2 may be referred to as a lower side D. The side of the first short side SS1 may be referred to as a left side (Le, x). The side of the second short side SS2 may be referred to as a right side Ri.

The first long side LS1, the second long side LS2, the first short side SS1, and the second short side SS2 may be referred to as an edge of the display device 1. In addition, a point where the first long side LS1, the second long side LS2, the first short side SS1, and the second short side SS2 meet each other may be referred to as a corner.

For example, a point where the first short side SS1 and the first long side LS1 meet may be referred to as a first corner C1. A point where the first long side LS1 and the second short side SS2 meet may be referred to as a second corner C2. A point where the second short side SS2 and the second long side LS2 meet may be referred to as a third corner C3. A point where the second long side LS2 and the first short side SS1 meet may be referred to as a fourth corner C4.

The display device 1 may include a frame 20 and a speaker assembly 100. The frame 20 may be located in a rearward direction of the display panel 10, and the display panel 10 may be coupled thereto.

Figure 4:
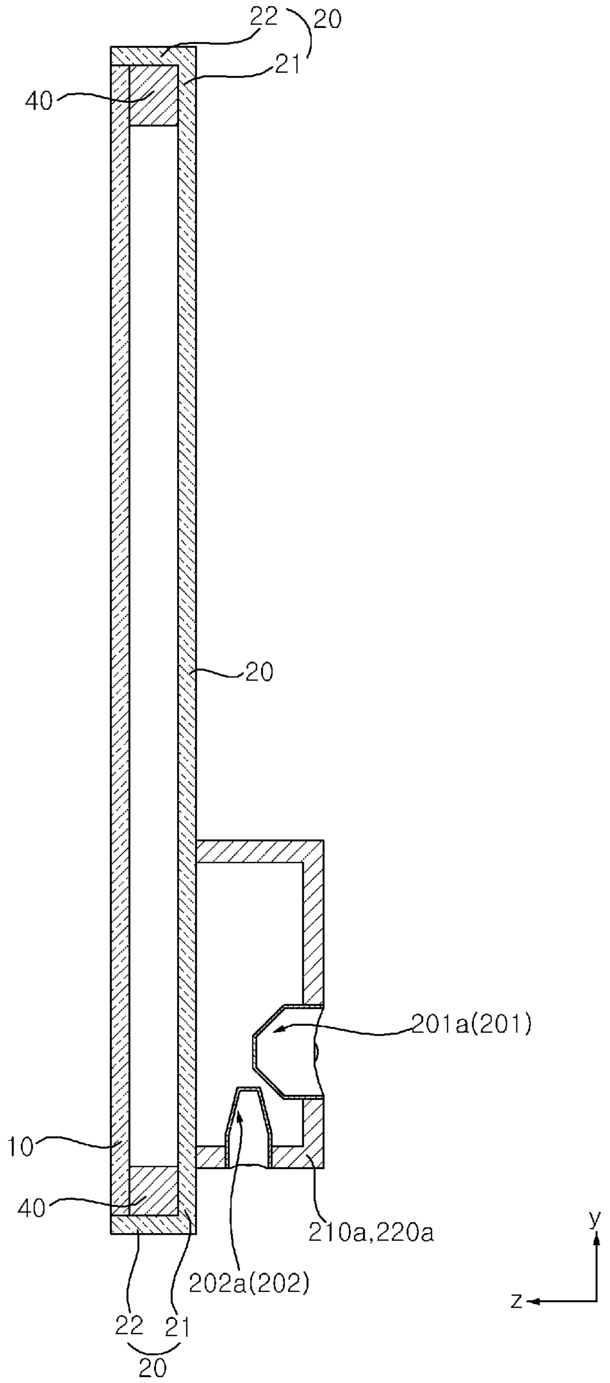

For example, the frame 20 may include a flat plate portion 21 covering in a rearward direction of the display panel 10 and a side portion 22 covering the side surface of the display panel 10 (see FIG. 4). A pad 40 may be disposed between the display panel 10 and the flat plate portion 21.

In this case, the upper side of the frame 20 may form the first long side LS1, and the lower side of the frame 20 may form the second long side LS2. In addition, the left side of the frame 20 may form the first short side SS1, and a right side of the frame 20 may form the second short side SS2.

The speaker assembly 100 may be adjacent to the lower side of the frame 20, and may be installed in the frame 20. The speaker assembly 100 may provide a sound in a forward direction of the display device 1.

Figure 2:
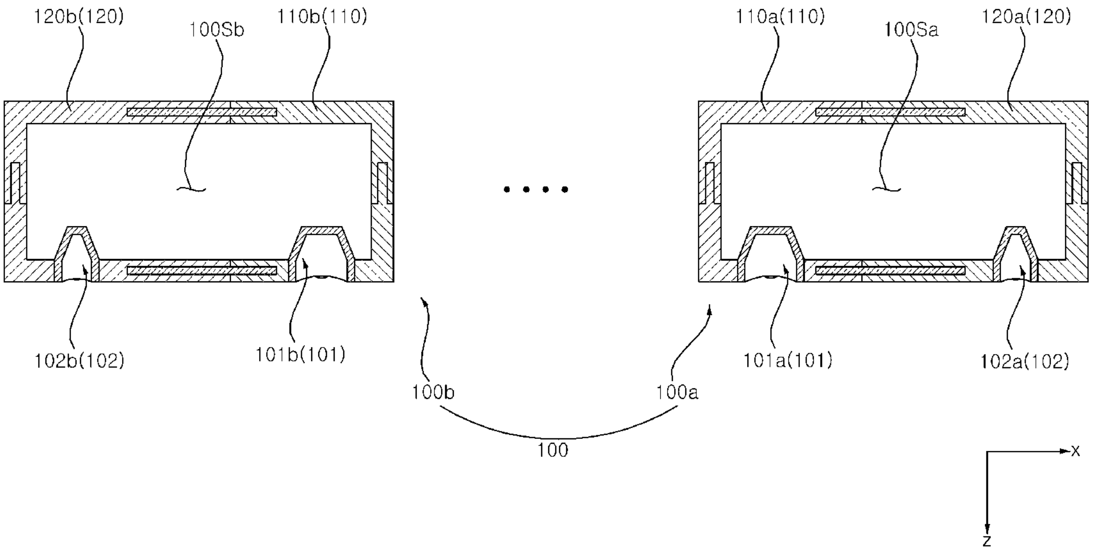

Referring to FIGS. 1 and 2, the speaker assembly 100 may include a left speaker assembly **100*a* and a right speaker assembly 100*b*** that are spaced apart from each other in the left-right direction.

The left speaker assembly **100*a* may be adjacent to the left side of the frame 20, i.e., the first short side SS1, and may be coupled to the frame 20 in the lower side of the frame 20. The left speaker assembly 100*a* may include a first speaker 101*a* and a second speaker 102*a* spaced apart from each other in the left-right direction. A first housing 110*a* may be coupled to the lower side of the frame 20, and the first speaker 101*a* may be provided on the front surface of the first housing 110*a*. A second housing 120*a* may be coupled to the lower side of the frame 20, and the second speaker 102*a* may be provided on the front surface of the second housing 120*a*. The first housing 110*a* may be connected to the second housing 120*a*, and an inner space of the first housing 110*a* and an inner space of the second housing 120*a* communicate with each other to form one left inner space 100**Sa.

For example, the second speaker **102*a* may be disposed closer to the left side of the frame 20, i.e., to the first short side SS1 than the first speaker 101*a*. In this case, the first speaker 101*a* may provide a low-pitched or mid-tone sound, and the second speaker 102*a* may provide a high-pitched sound. The first speaker 101*a* may be a woofer, and the second speaker 102*a* may be a tweeter. Meanwhile, the first speaker 101*a* may be referred to as a first speaker unit, and the second speaker 102*a*** may be referred to as a second speaker unit.

The right speaker assembly **100*b* may be adjacent to the right side of the frame 20, i.e., the second short side SS2, and may be coupled to the frame 20 in the lower side of the frame 20. The right speaker assembly 100*b* may include a first speaker 101*b* and a second speaker 102*b* that are spaced apart from each other in the left-right direction. The first housing 110*b* may be coupled to the lower side of the frame 20, and the first speaker 101*a* may be provided on the front surface of the first housing 110*b*. The second housing 120*b* may be coupled to the lower side of the frame 20, and the second speaker 102*b* may be provided on the front surface of the second housing 120*b*. The first housing 110*b* may be connected to the second housing 120*b*, and the inner space of the first housing 110*b* and the inner space of the second housing 120*b* may communicate with each other to form one right inner space 100**Sb.

For example, the second speaker **102*b* may be disposed closer to the right side of the frame 20, i.e., to the second short side SS2 than the first speaker 101*b*. In this case, the first speaker 101*b* may provide a low-pitched or mid-tone sound, and the second speaker 102*b* may provide a high-pitched sound. The first speaker 101*b* may be a woofer, and the second speaker 102*b* may be a tweeter. Meanwhile, the first speaker 101*b* may be referred to as a first speaker unit, and the second speaker 102*b*** may be referred to as a second speaker unit.

Meanwhile, the left speaker assembly **100*a* and the right speaker assembly 100*b* may be symmetrical vertically. That is, the description of each of the first speaker 101***a*, the second speaker 102*a*, the first housing 110*a*, and the second housing 120*a* of the left speaker assembly 100*a* may be identically applied to each of the first speaker 101*b*, the second speaker 102*b*, the first housing 110*b*, and the second housing 120*b* of the right speaker assembly 100*b*. In this case, the first speaker 101*a* and the first speaker 101*b* may be collectively referred to as a first speaker 101 or a first speaker unit 101, and the second speaker 102*a* and the second speaker 102*b* may be collectively referred to as a second speaker 102 or a second speaker unit 102. In addition, the first housing 110*a* and the first housing 110*b* may be collectively referred to as a first housing 110, and the second housing 120*a* and the second housing 120*b* may be collectively referred to as a second housing 120.

Figure 3:
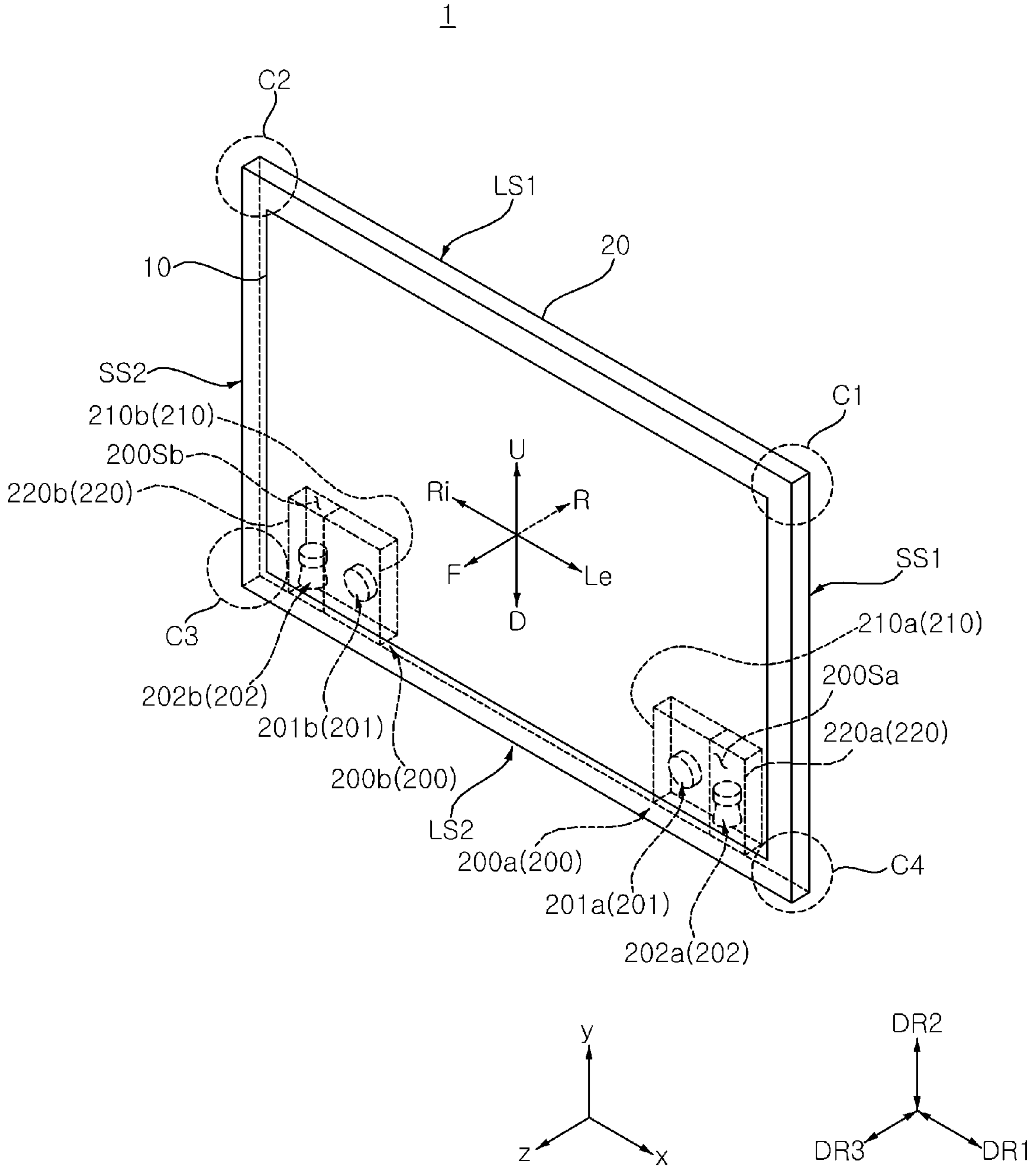

Referring to FIGS. 3 and 4, the speaker assembly 200 may be adjacent to the lower side of the frame 20, and may be installed in the frame 20. The speaker assembly 200 may provide sound in a rearward direction of the display device 1 and to the lower side of the display device 1. The speaker assembly 200 may include a left speaker assembly 200*a* and a right speaker assembly 200*b* that are spaced apart from each other in the left-right direction.

The left speaker assembly 200*a* may be adjacent to the left side of the frame 20, i.e., to the first short side SS1, and may be coupled to the frame 20 in a rearward direction of the frame 20. The left speaker assembly 200*a* may include a first speaker 201*a* and a second speaker 202*a* spaced apart from each other in the left-right direction. The first housing 210*a* may be coupled to the rear side of the frame 20, and the first speaker 201*a* may be provided on the rear surface of the first housing 210*a*. The second housing 220*a* may be coupled to the rear side of the frame 20, and the second speaker 202*a* may be provided on the lower surface of the second housing 220*a*. The first housing 210*a* may be connected to the second housing 220*a*, and the inner space of the first housing 210*a* and the inner space of the second housing 220*a* may communicate with each other to form one left inner space 200Sa.

For example, the second speaker 202*a* may be disposed closer to the left side of the frame 20, i.e., to the first short side SS1 than the first speaker 201*a*. In this case, the first speaker 201*a* may provide a low-pitched or mid-tone sound, and the second speaker 202*a* may provide a high-pitched sound. The first speaker 201*a* may be a woofer, and the second speaker 202*a* may be a tweeter. Meanwhile, the first speaker 201*a* may be referred to as a first speaker unit, and the second speaker 202*a* may be referred to as a second speaker unit.

The right speaker assembly 200*b* may be adjacent to the right side of the frame 20, i.e., to the second short side SS2, and may be coupled to the frame 20 in a rearward direction of the frame 20. The right speaker assembly 200*b* may include a first speaker 201*b* and a second speaker 202*b* spaced apart from each other in the left-right direction. The first housing 210*b* may be coupled to the rear side of the frame 20, and the first speaker 201*b* may be provided on the rear surface of the first housing 210*b*. The second housing 220*b* may be coupled to the rear side of the frame 20, and the second speaker 202*b* may be coupled to the lower surface of the second housing 220*b*. The first housing 210*b* may be connected to the second housing 220*b*, and the inner space of the first housing 210*b* and the inner space of the second housing 220*b* may communicate with each other to form one right inner space 200Sb.

For example, the second speaker 202*b* may be disposed closer to the right side of the frame 20, i.e., to the second short side SS2 than the first speaker 201*b*. In this case, the first speaker 201*b* may provide a low-pitched or mid-tone sound, and the second speaker 202*b* may provide a high-pitched sound. The first speaker 201*b* may be a woofer, and the second speaker 202*b* may be a tweeter. Meanwhile, the first speaker 201*b* may be referred to as a first speaker unit, and the second speaker 202*b* may be referred to as a second speaker unit.

Meanwhile, the left speaker assembly 200*a* and the right speaker assembly 200*b* may be symmetrical vertically. That is, the description of each of the first speaker 201*a*, the second speaker 202*a*, the first housing 210*a*, and the second housing 220*a* of the left speaker assembly 200*a* may be identically applied to each of the first speaker 201*b*, the second speaker 202*b*, the first housing 210*b*, and the second housing 220*b*. In this case, the first speaker 201*a* and the first speaker 201*b* may be collectively referred to as a first speaker 201 or a first speaker unit 201, and the second speaker 202*a* and the second speaker 202*b* may be collectively referred to as a second speaker 202 or a second speaker unit 202. In addition, the first housing 210*a* and the first housing 210*b* may be collectively referred to as a first housing 210, and the second housing 220*a* and the second housing 220*b* may be collectively referred to as a second housing 220.

Figure 5:
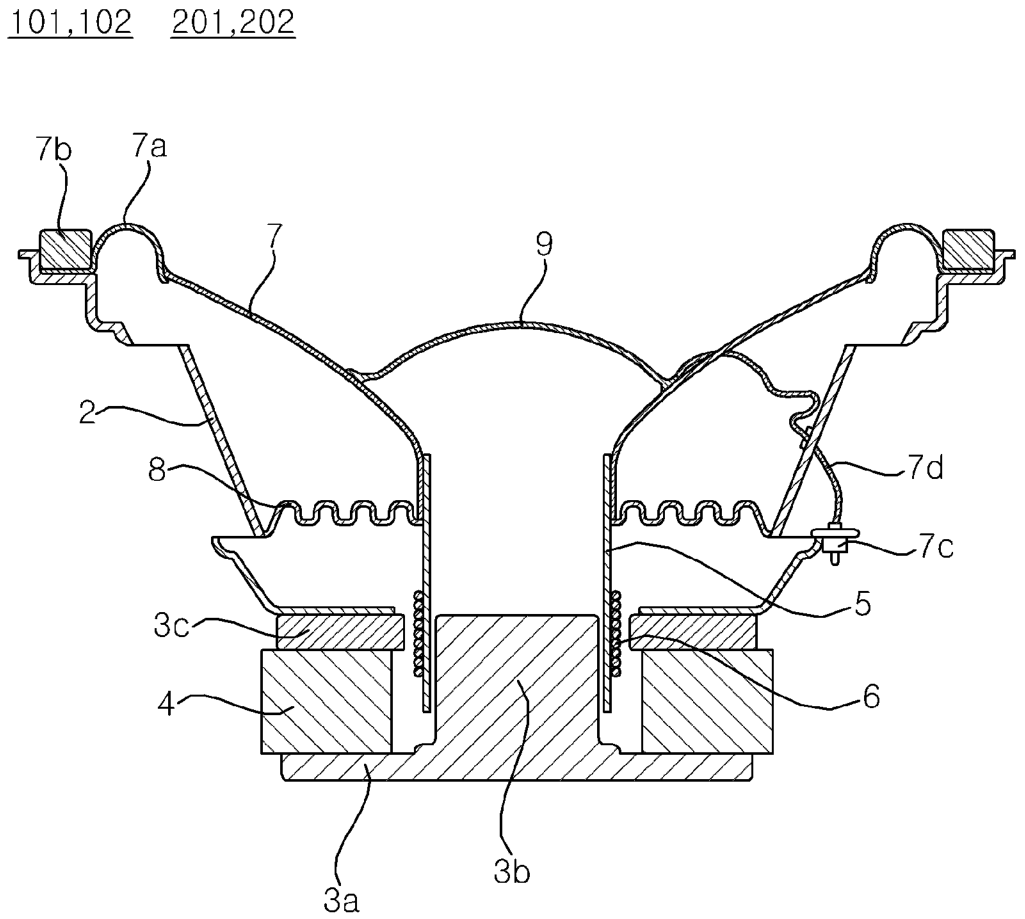

Referring to FIG. 5, each of the first speaker (101; 201) and the second speaker (102; 202) may include the following speaker components.

The frame 2 may form an outer shape of the speaker. The frame 2 may provide a space in which components of the speaker described later are installed. At least some of the components of the speaker including the frame 2 may be disposed in the inner space of the first housing (110; 210) or the second housing (120; 220) (see FIGS. 2 and 3).

A bottom plate 3*a* may form one side of the speaker. A pole piece 3*b* may protrude from a central portion of the bottom plate 3*a* to the other side of the speaker, and may be formed as a solid cylinder. A top plate 3*c* may be spaced apart from the bottom plate 3*a* to the other side of the speaker, and may be formed in a ring shape so that a portion of the pole piece 3*b* may penetrate. In this case, an air gap (unsigned) may be formed between the top plate 3*c* and the pole piece 3*b*.

A magnet 4 may be disposed between the bottom plate 3*a* and the top plate 3*c*, and may be formed in a ring shape so that a portion of the pole piece 3*b* may penetrate. A bobbin 5 may be installed in the air gap, and a voice coil 6 may be wound. At this time, an input terminal 7*c* and a gold wire 7*d* may transmit electrical energy output from an amplifier (not shown) to the voice coil 6. In addition, an elastic spider 8 may be coupled to the bobbin 5 and the frame 2 between the bobbin 5 and the frame 2, and may support the bobbin 5. Meanwhile, the spider 8 may be referred to as a damper.

A diaphragm 7 may be formed in a cone shape, and one side of the diaphragm 7 may be coupled or attached to the bobbin 5, and the other side of the diaphragm 7 may be supported by an elastic edge 7*a*. At this time, a gasket 7*b* may be provided on the side surface of the edge 7*a*, and can prevent the interference of a surrounding mechanism with the vibrating diaphragm 7. Meanwhile, a dust cap 9 may cover the central portion of the diaphragm 7, and may block the inflow of dust into a magnetic circuit.

Accordingly, a magnetic force line by the magnet 4 may be formed in the air gap, and when current flows in the voice coil 6, a Lorentz force may be generated. The magnitude of the Lorentz force may be proportional to the magnitude of the magnetic force line (magnetic flux density), the amount of current, and the length of the wound coil, and the direction of the force may be in a direction perpendicular to a plane formed by the magnetic flux density and the current. That is, the diaphragm 7 may vibrate in a direction toward the one side or the other side of the speaker. At this time, when the diaphragm 7 moves in the direction toward the other side of the speaker, positive (+) sound pressure may be generated, and when the diaphragm 7 moves in a direction toward the one side of the speaker, negative (−) sound pressure may be generated. That is, the speaker may provide sound in a direction toward the other side of the speaker. Further, according to the vibration of the diaphragm 7, air existing in the inner space of the first housing (110; 210) or the inner space of the second housing (120; 220) also resonates, and the pressure thereof may be changed.

Hereinafter, for a brief description, a description will be made based on the speaker assembly 100 described above with reference to FIGS. 1 and 2, and the above description may be identically applied to the speaker assembly 200 described above with reference to FIGS. 3 and 4.

Figure 6:
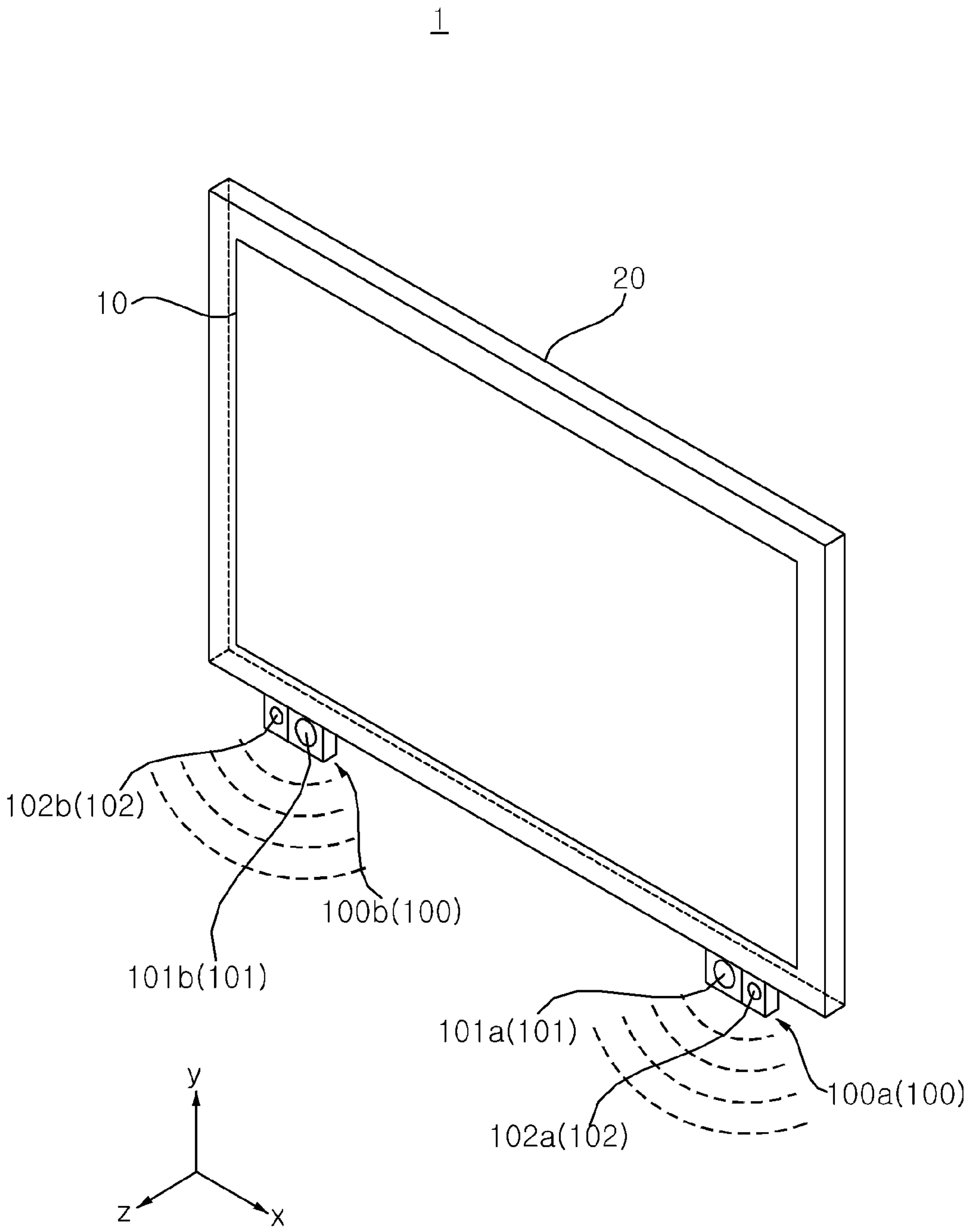
Figure 7:
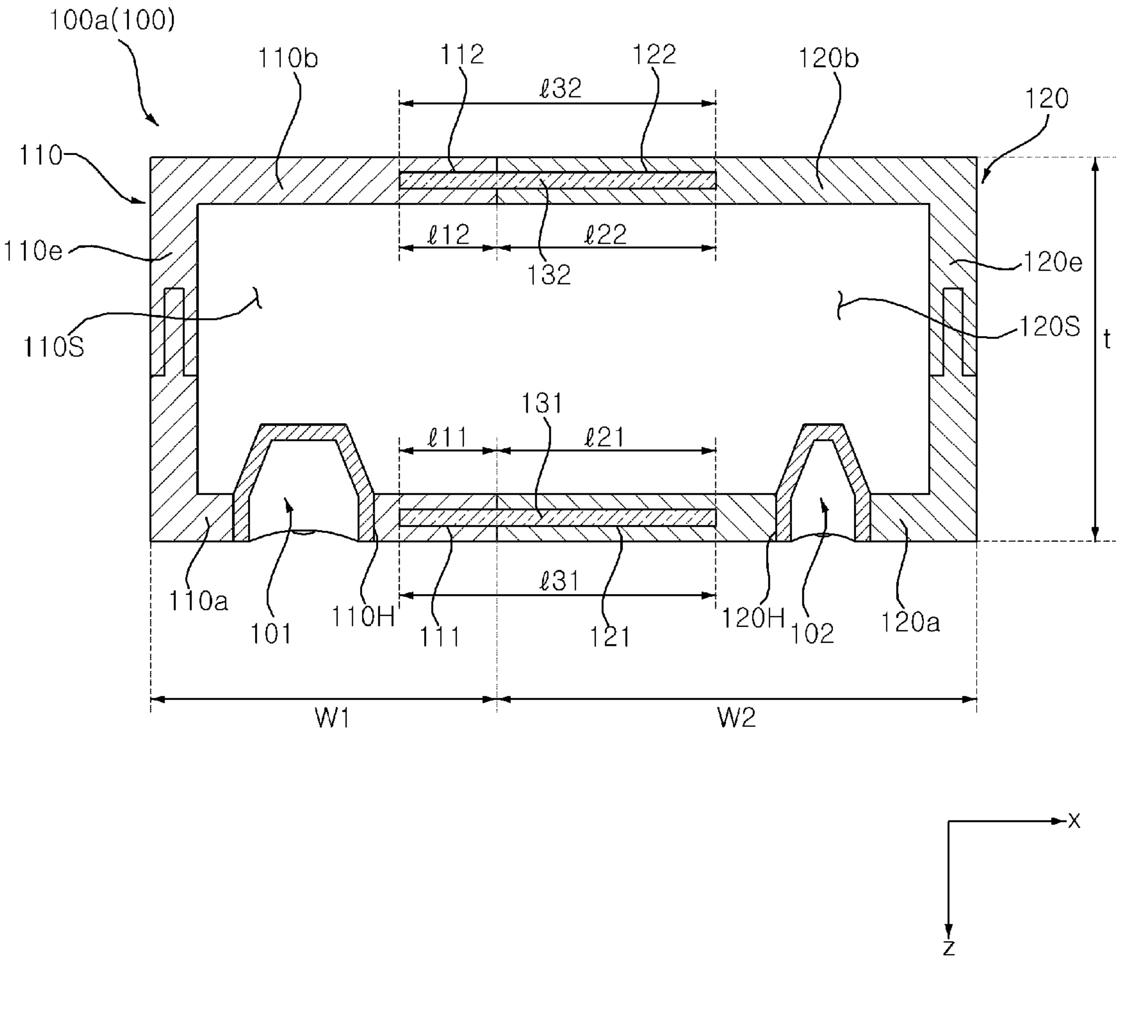

Referring to FIGS. 6 and 7, the display device 1 may be flat. That is, the front surface of the display panel 10 may form a flat surface. Hereinafter, for a brief description, a description will be made based on the left speaker assembly 100*a*, and the above description may be identically applied to the right speaker assembly 100*b* symmetrical to the left speaker assembly 100*a*.

The first housing 110 may have a rectangular cylindrical shape as a whole. The inner space 110S of the first housing 110 may be opened toward the second housing 120, i.e., to the left of the first housing 110. The width w1 of the first housing 110 may be defined in the left-right direction, the thickness t of the first housing 110 may be defined in the front-rear direction, and the height of the first housing 110 may be defined in the up-down direction.

Specifically, the first housing 110 may include a first front portion 110*a*, a first rear portion 110*b*, a first top portion 110*c* (see FIG. 14), a first bottom portion 110*d* (see FIG. 15), and a first side portion 110*e*. The first side portion 110*e* may extend long in the front-rear direction, and may form a right side of the first housing 110. The first front portion 110*a* may extend to the left from the front end of the first side portion 110*e*, and may form a front side of the first housing 110. The first rear portion 110*b* may extend to the left from the rear end of the first side portion 110*e*, and may form a rear side of the first housing 110. The first top portion 110*c* may extend to the left from the upper end of the first side portion 110*e*, and may form an upper side of the first housing 110. The first bottom portion 110*d* may extend to the left from the lower end of the first side portion 110*e*, and may form a lower side of the first housing 110. The first front portion 110*a*, the first rear portion 110*b*, the first top portion 110*c*, the first bottom portion 110*d*, and the first side portion 110*e* may define the boundary of the inner space 110S of the first housing 110. Meanwhile, the first side portion 110*e* may be separated roughly in half or combined again.

A first speaker hole 110H may be formed by penetrating the first front portion 110*a* of the first housing 110 in the front-rear direction. The first speaker 101 may be mounted in the first speaker hole 110H, and may provide sound in a forward direction.

A first front slot 111 may be formed from the distal end of the first front portion 110*a* toward the inner side of the first front portion 110*a*. In other words, the first front slot 111 may be a groove formed in the distal end of the first front portion 110*a*. The first front slot 111 may be formed to be long in the left-right direction, and may have a certain length 111. One end of the first front slot 111 may be located at the distal end of the first front portion 110*a*, and the other end of the first front slot 111 may be spaced apart from a portion where the first speaker hole 110H of the first front portion 110*a* is formed.

The first rear slot 112 may be formed from the distal end of the first rear portion 110*b* toward the inner side of the first rear portion 110*b*. In other words, the first rear slot 112 may be a groove formed at the distal end of the first rear portion 110*b*. The first rear slot 112 may be formed to be long in the left-right direction, and may have a certain length 112. One end of the first rear slot 112 may be located at the distal end of the first rear portion 110*b*. In the front-rear direction, the first rear slot 112 may be aligned with the first front slot 111. In this case, the length 112 of the first rear slot 112 may be the same as the length 111 of the first front slot 111.

The second housing 120 may have a rectangular cylindrical shape as a whole. The inner space 120S of the second housing 120 may be opened in a direction toward the first housing 110, i.e., toward the right of the second housing 120, and may communicate with the inner space 110S of the first housing 110. The width w2 of the second housing 120 may be defined in the left-right direction, the thickness t of the second housing 120 may be defined in the front-rear direction, and the height of the second housing 120 may be defined in the up-down direction. For example, the thickness t and the height of the second housing 120 may be the same as the thickness t and the height of the first housing 110. For example, the width w2 of the second housing 120 may be equal to or greater than the width w1 of the first housing 110.

Specifically, the second housing 120 may include a second front portion 120*a*, a second rear portion 120*b*, a second top portion 120*c* (see FIG. 14), a second bottom portion 120*d* (see FIG. 15), and a second side portion 120*e*. The second side portion 120*e* may extend long in the front-rear direction, and may form a left side of the second housing 120. The second front portion 120*a* may extend to the right from the front end of the second side portion 120*e*, and may form a front side of the second housing 120. The second rear portion 120*b* may extend to the right from the rear end of the second side portion 120*e*, and may form a rear side of the second housing 120. The second top portion 120*c* may extend from the upper end of the second side portion 120*e* to the right, and may form an upper side of the second housing 120. The second bottom portion 120*d* may extend from the lower end of the second side portion 120*e* to the right, and may form a lower side of the second housing 120. The second front portion 120*a*, the second rear portion 120*b*, the second top portion 120*c*, the second bottom portion 120*d*, and the second side portion 120*e* may define the boundary of the inner space 120S of the second housing 120. Meanwhile, the second side portion 120*e* may be separated roughly in half or combined again.

A second speaker hole 120H may be formed to penetrate the second front portion 120*a* of the second housing 120 in the front-rear direction. The second speaker 102 may be mounted in the second speaker hole 120H, and may provide sound in a forward direction.

The second front slot 121 may be formed from the distal end of the second front portion 120*a* toward the inner side of the second front portion 120*a*. In other words, the second front slot 121 may be a groove formed at the distal end of the second front portion 120*a*. The second front slot 121 may be formed to be long in the left-right direction, and may have a certain length 121. One end of the second front slot 121 may be located at the distal end of the second front portion 120*a*, and the other end of the second front slot 121 may be spaced apart from a portion where the second speaker hole 120H of the second front portion 120*a* is formed.

A second rear slot 122 may be formed from the distal end of the second rear portion 120*b* toward the inner side of the second rear portion 120*b*. In other words, the second rear slot 122 may be a groove formed at the distal end of the second rear portion 120*b*. The second rear slot 122 may be formed to be long in the left-right direction, and may have a certain length 122. One end of the second rear slot 122 may be located at the distal end of the second rear portion 120*b*. In the front-rear direction, the second rear slot 122 may be aligned with the second front slot 121. In this case, the length 122 of the second rear slot 122 may be the same as the length 121 of the second front slot 121.

A front plate 131 may extend long in a direction intersecting the first housing 110 and the second housing 120, and may be inserted into the first front slot 111 and the second front slot 121. For example, the length direction of the front plate 131 may be parallel to the left-right direction. For example, the front plate 131 may be fixed to the first front slot 111 and movably coupled to the second front slot 121. In other words, a portion of the front plate 131 may protrude from the first housing 110 toward the second housing 120. In addition, the length 131 of the front plate 131 may be equal to or smaller than the sum of the length 111 of the first front slot 111 and the length 121 of the second front slot 121.

A rear plate 132 may extend long in a direction intersecting the first housing 110 and the second housing 120, and may be inserted into the first rear slot 112 and the second rear slot 122. For example, the length direction of the rear plate 132 may be parallel to the left-right direction. For example, the rear plate 132 may be fixed to the first rear slot 112, and may be movably coupled to the second rear slot 122. In other words, a portion of the rear plate 132 may protrude from the first housing 110 toward the second housing 120. In addition, the length 132 of the rear plate 132 may be equal to or smaller than the sum of the length 112 of the first rear slot 112 and the length 122 of the second rear slot 122.

Meanwhile, when the display device 1 is flat, the left distal end of the first housing 110 may be in contact with the right distal end of the second housing 120. That is, the distal end of the first front portion 110*a* may be in contact with the distal end of the second front portion 120*a*, and the distal end of the first rear portion 110*b* may be in contact with the distal end of the second rear portion 120*b*. In this case, the overall width of the left speaker assembly 100*a* may be equal to the sum of the width w1 of the first housing 110 and the width w2 of the second housing 120.

In this case, the front plate 131 may not be exposed between the distal end of the first front portion 110*a* and the distal end of the second front portion 120*a*. In addition, the rear plate 132 may not be exposed between the distal end of the first rear portion 110*b* and the distal end of the second rear portion 120*b*. However, in some embodiments, a portion of the front plate 131 and a portion of the rear plate 132 can be exposed.

Figure 8:
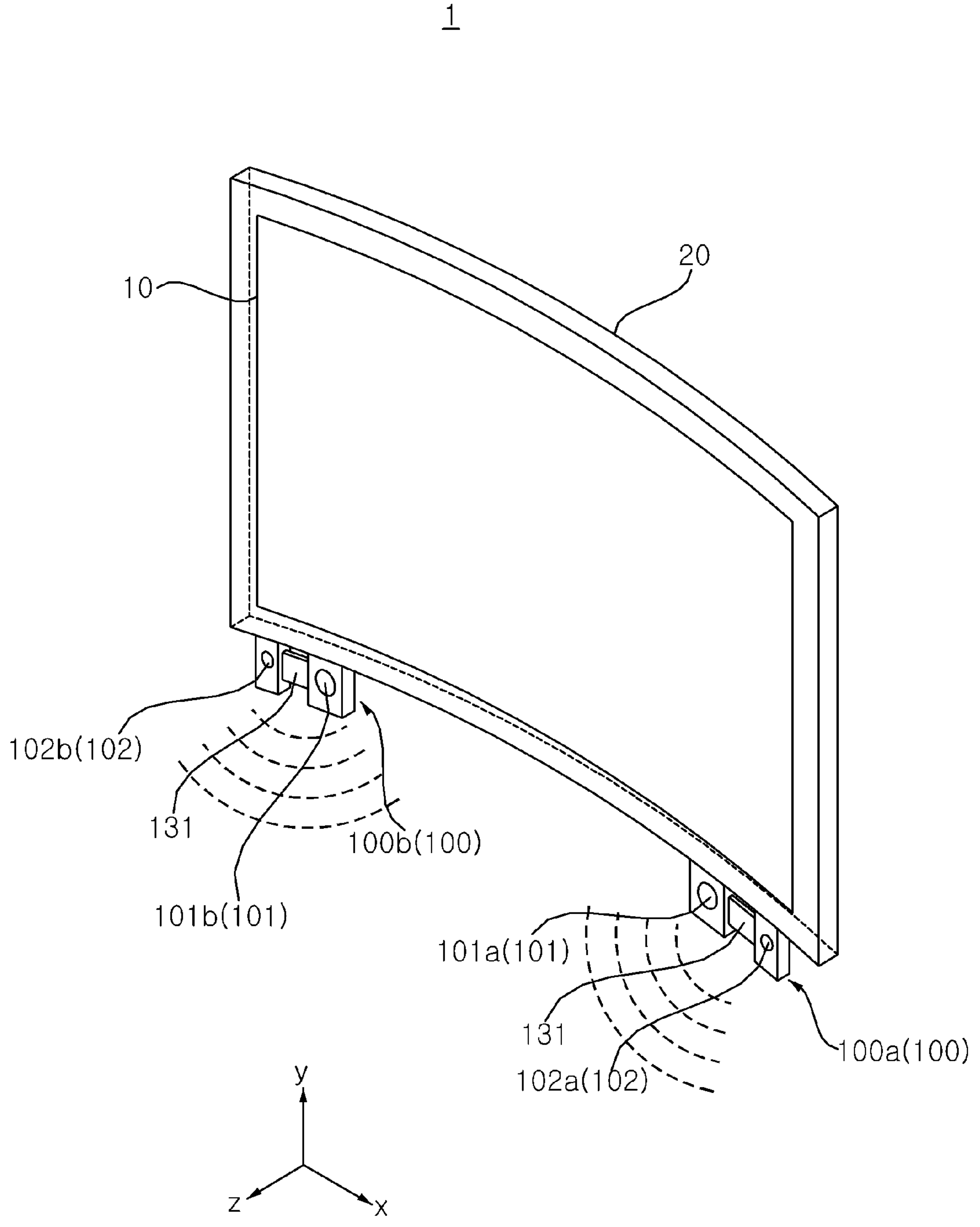
Figure 9:
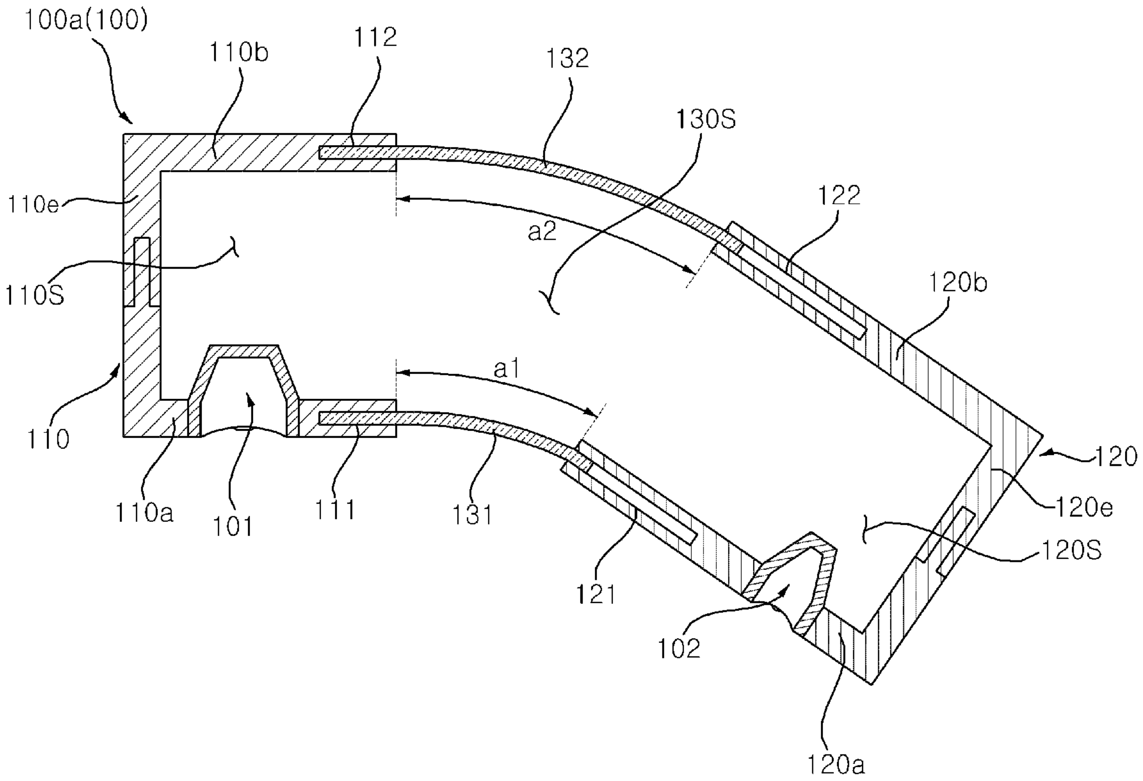

Referring to FIGS. 8 and 9, the display device 1 may be bent, and may provide a strong sense of immersion to a user. For example, the display device 1 may be convexly bent rearward by a force applied by a user or a force provided from a drive system provided in the frame 20. In this case, the display panel 10 and the frame 20 may be flexible. Hereinafter, for a brief description, a description will be made based on the left speaker assembly 100*a*, and the above description may be identically applied to the right speaker assembly 100*b* symmetrical to the left speaker assembly 100*a*. Meanwhile, the display device 1 may be referred to as a bendable display device.

A portion of each of the front plate 131 and the rear plate 132 may slide in a direction separated from each of the second front slot 121 and the second rear slot 122, in correspondence with the bending operation. In other words, the second housing 120 may move in a direction away from the first housing 110 and the front plate 131 and the rear plate 132 fixed thereto. In this case, the front plate 131 and the rear plate 132 may be flexible. For example, the front plate 131 and the rear plate 132 may include an aluminum Al material.

A portion of the front plate 131 may be exposed between the distal end of the first front portion 110*a* and the distal end of the second front portion 120*a*, and may be convexly bent. The center of curvature of the partial front plate 131 may be located on the center of curvature of the display device 1. A portion of the rear plate 132 may be exposed between the distal end of the first rear portion 110*b* and the distal end of the second rear portion 120*b*, and may be convexly bent. The center of curvature of the partial rear plate 132 may be located on the center of curvature of the display device 1.

In this case, the length a2 of the portion of the rear plate 132 may be greater than the length a1 of the portion of the front plate 131. In addition, the curvature of the portion of the rear plate 132 may be smaller than the curvature of the portion of the front plate 131.

That is, the left speaker assembly 100*a* may be opened in the width direction, in correspondence with the above-described bending operation of the display device 1, and may be bent with respect to the center of curvature of the display device 1. Similarly, the right speaker assembly 100*b* may be opened in the width direction, in correspondence with the above-described bending operation of the display device 1, and may be bent with respect to the center of curvature of the display device 1.

Accordingly, the sound providing direction of the speaker assembly 100 may be toward the ear of a user watching the bent display device 1. That is, in comparison with a case in which the speaker assembly is disposed in the center of the display device, the speaker assembly 100 may provide a user with an improved sense of presence and high-quality sound, thereby achieving an acoustic lens effect.

In addition, when the speaker assembly 100 changes from a flat shape (see FIG. 7) to a bent shape (see FIG. 9), the inner space of the speaker assembly 100 may be enlarged by the portion of the front plate 131 and the portion of the rear plate 132. That is, the inner space of the speaker assembly 100 may be equal to the sum of the inner space 110S of the first housing 110, the inner space 120S of the second housing 120, and the expansion space 130S. Accordingly, the reproduction band of the sound provided by the speaker assembly 100 may be expanded, and the sound pressure of the sound may be increased.

Figure 10:
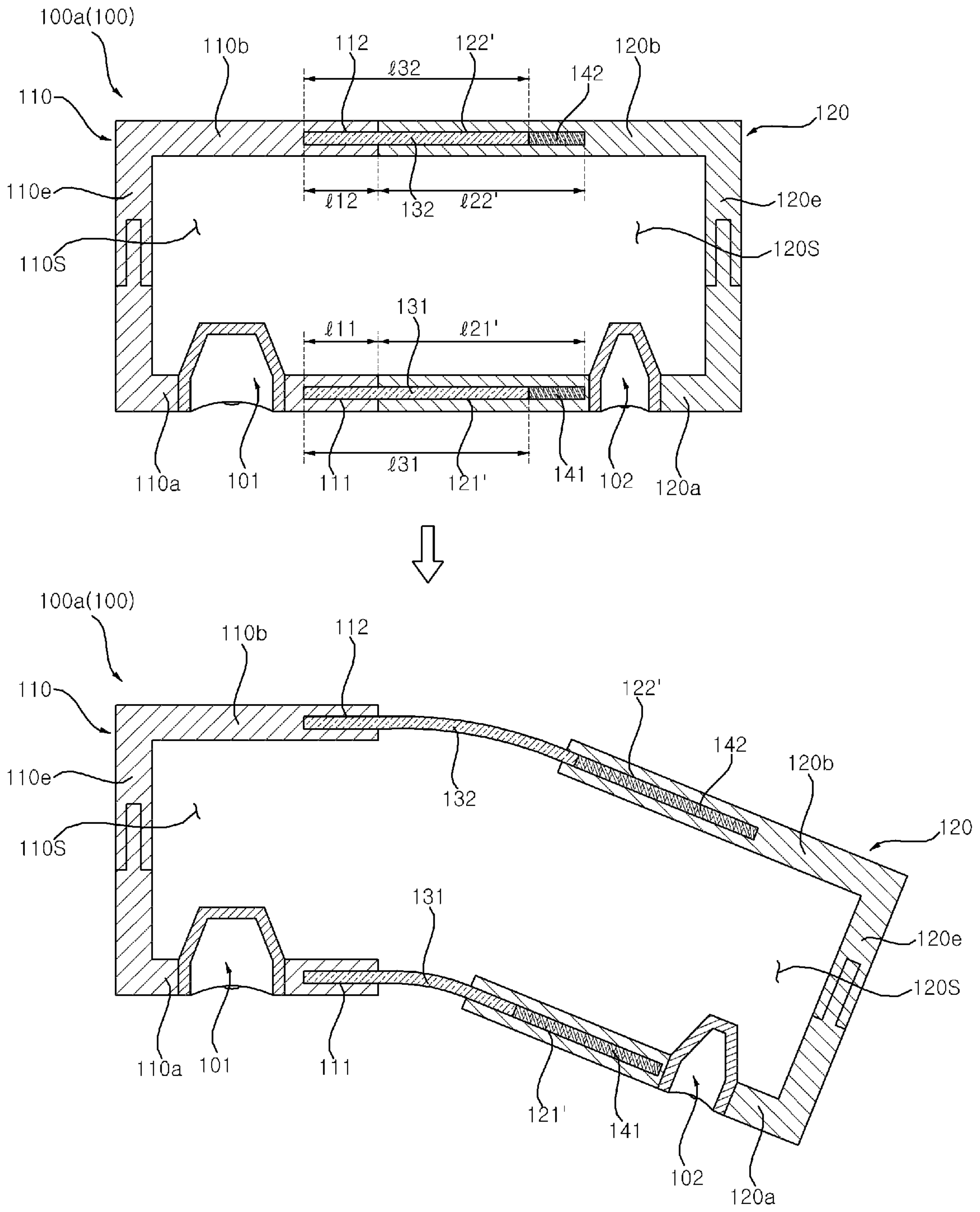

Referring to FIG. 10, a second front slot 121' may be formed from the distal end of the second front portion 120*a* toward the inner side of the second front portion 120*a*. In other words, the second front slot 121' may be a groove formed at the distal end of the second front portion 120*a*. The second front slot 121' may be formed to be long in the left-right direction, and may have a certain length 121'. One end of the second front slot 121' may be located at the distal end of the second front portion 120*a*, and the other end of the second front slot 121' may be spaced apart from a portion where the second speaker hole 120H of the second front portion 120*a* is formed.

In this case, the front plate 131 may be inserted into the first front slot 111 and the second front slot 121', and the length 131 of the front plate 131 may be smaller than the sum of the length 111 of the first front slot 111 and the length 121' of the second front slot 121'.

A second front elastic member 141 may be disposed between the front plate 131 and the other end of the second front slot 121'. One end of the second front elastic member 141 may be fixed to the front plate 131, and the other end of the second front elastic member 141 may be fixed to the other end of the second front slot 121'. The second front elastic member 141 may have elasticity, and may extend or compressed in the length direction of the front plate 131, i.e., in the left-right direction. For example, the second front elastic member 141 may be a spring.

A second rear slot 122' may be formed from the distal end of the second rear portion 120*b* toward the inner side of the second rear portion 120*b*. In other words, the second rear slot 122' may be a groove formed at the distal end of the second rear portion 120*b*. The second rear slot 122' may be formed to be long in the left-right direction, and may have a certain length 122'. One end of the second rear slot 122' may be located at the distal end of the second rear portion 120*b*. In the front-rear direction, the second rear slot 122' may be aligned with the second front slot 121'. In this case, the length 122' of the second rear slot 122' may be the same as the length 121' of the second front slot 121'.

In this case, the rear plate 132 may be inserted into the first rear slot 112 and the second rear slot 122', and the length 132 of the rear plate 132 may be smaller than the sum of the length 112 of the first rear slot 112 and the length 122' of the second rear slot 122'.

A second rear elastic member 142 may be disposed between the rear plate 132 and the other end of the second rear slot 122'. One end of the second rear elastic member 142 may be fixed to the rear plate 132, and the other end of the second rear elastic member 142 may be fixed to the other end of the second rear slot 122'. The second rear elastic member 142 may have elasticity, and may extend or compressed in the length direction of the rear plate 132, i.e., in the left-right direction. For example, the second rear elastic member 142 may be a spring.

Referring to FIG. 10, when the left speaker assembly 100*a* is flat, the front plate 131 may not be exposed between the distal end of the first front portion 110*a* and the distal end of the second front portion 120*a*. In this case, the second front elastic member 141 may be in a compressed state.

In addition, when the left speaker assembly 100*a* is flat, the rear plate 132 may not be exposed between the distal end of the first rear portion 110*b* and the distal end of the second rear portion 120*b*. In this case, the second rear elastic member 142 may be in a compressed state.

Referring to the lower drawing of FIG. 10, when the left speaker assembly 100*a* is in a bent shape, a portion of the front plate 131 may be exposed between the distal end of the first front portion 110*a* and the distal end of the second front portion 120*a*, and may be bent convexly. In this case, the second front elastic member 141 may assist the sliding movement of the front plate 131 with respect to the second front slot 121'. That is, the second front elastic member 141 may be restored to its initial state and may extend, and may push the front plate 131 in a direction of being separated from the second front slot 121'.

In addition, when the left speaker assembly 100*a* is in a bent shape, a portion of the rear plate 132 may be exposed between the distal end of the first rear portion 110*b* and the distal end of the second rear portion 120*b*, and may be convexly bent. In this case, the second rear elastic member 142 may assist the sliding movement of the rear plate 132 with respect to the second rear slot 122'. That is, the second rear elastic member 142 may be restored to its initial state and may extend, and may push the rear plate 132 in a direction of being separated from the second rear slot 122'.

Meanwhile, the above-described second front elastic member 141 and second rear elastic member 142 and a related configuration may be identically applied to the right speaker assembly 100*b* (see FIG. 8).

Accordingly, the speaker assembly 100 may be smoothly changed into a bent shape, in correspondence with the bending operation of the display device 1.

Figure 11:
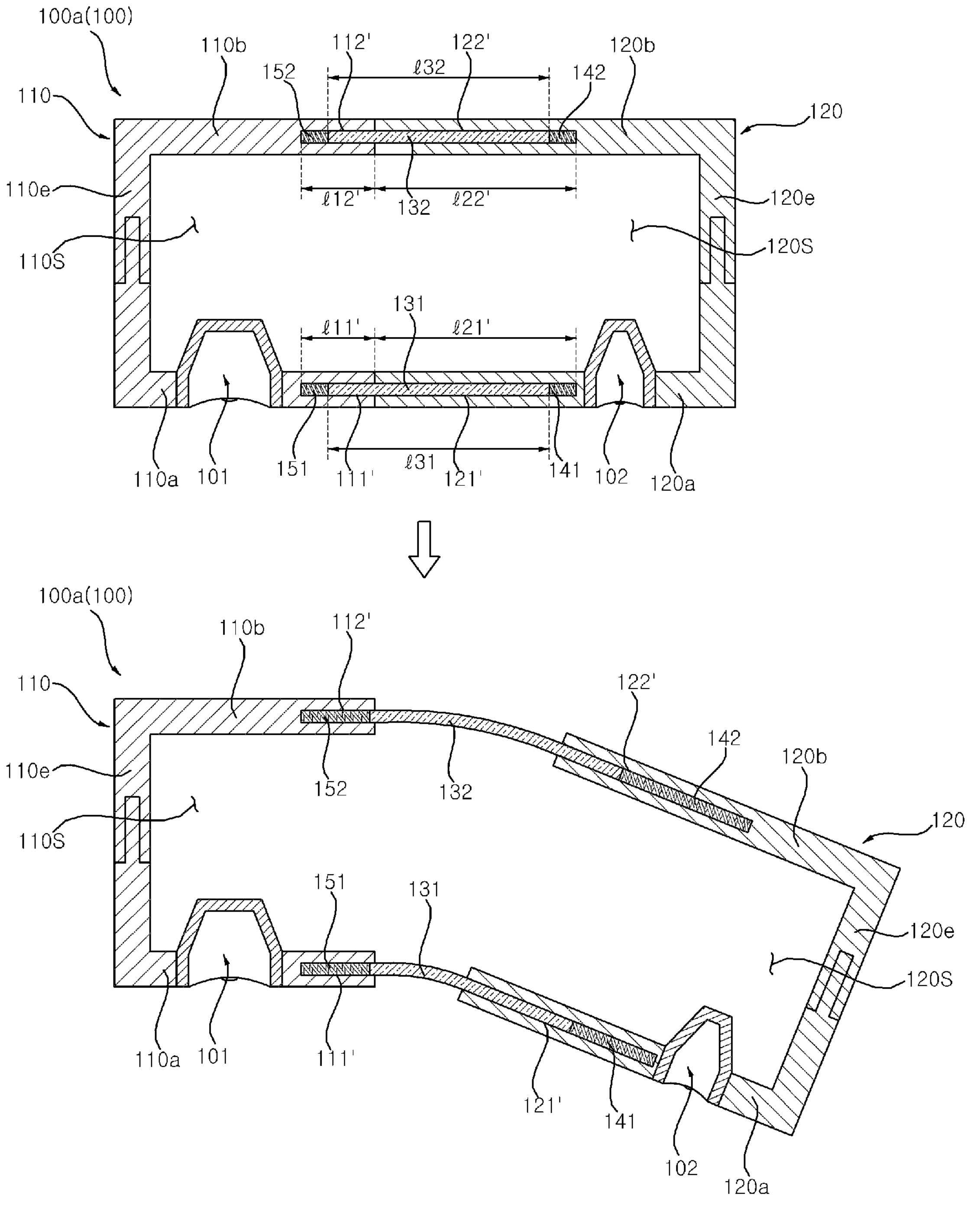

Referring to FIG. 11, the first front slot 111' may be formed from the distal end of the first front portion 110*a* toward the inner side of the first front portion 110*a*. In other words, the first front slot 111' may be a groove formed at the distal end of the first front portion 110*a*. The first front slot 111' may be formed to be long in the left-right direction, and may have a certain length 111'. One end of the first front slot 111' may be located at the distal end of the first front portion 110*a*, and the other end of the first front slot 111' may be spaced apart from a portion where the first speaker hole 110H of the first front portion 110*a* is formed.

At this time, the front plate 131 may be inserted into the first front slot 111' and the second front slot 121', and the length 131 of the front plate 131 may be smaller than the sum of the length 111' of the first front slot 111' and the length 121' of the second front slot 121'.

The first front elastic member 151 may be disposed between the front plate 131 and the other end of the first front slot 111'. One end of the first front elastic member 151 may be fixed to the front plate 131, and the other end of the first front elastic member 151 may be fixed to the other end of the first front slot 111'. The first front elastic member 151 may have elasticity, and may be expanded or compressed in the length direction of the front plate 131, i.e., in the left-right direction. In addition, the first front elastic member 151 may face the second front elastic member 141 with respect to the front plate 131. For example, the first front elastic member 151 may be a spring. Meanwhile, the first front elastic member 151 may be referred to as an auxiliary elastic member.

The first rear slot 112' may be formed from the distal end of the first rear portion 110*b* toward the inner side of the first rear portion 110*b*. In other words, the first rear slot 112' may be a groove formed at the distal end of the first rear portion 110*b*. The first rear slot 112' may be formed to be long in the left-right direction, and may have a certain length 112'. One end of the first rear slot 112' may be located at the distal end of the first rear portion 110*b*. In the front-rear direction, the first rear slot 112' may be aligned with the first front slot 111'. In this case, the length 112' of the first rear slot 112' may be the same as the length 111' of the first front slot 111'.

At this time, the rear plate 132 may be inserted into the first rear slot 112' and the second rear slot 122', and the length 132 of the rear plate 132 may be smaller than the sum of the length 112' of the first rear slot 112' and the length 122' of the second rear slot 122'.

A first rear elastic member 152 may be disposed between the rear plate 132 and the other end of the first rear slot 112'. One end of the first rear elastic member 152 may be fixed to the rear plate 132, and the other end of the first rear elastic member 152 may be fixed to the other end of the first rear slot 112'. The first rear elastic member 152 may have elasticity, and may extend or compressed in the length direction of the rear plate 132, i.e., in the left-right direction. In addition, the first rear elastic member 152 may face the second rear elastic member 142 with respect to the rear plate 132. For example, the first rear elastic member 152 may be a spring. Meanwhile, the first rear elastic member 152 may be referred to as an auxiliary elastic member.

Referring to the upper drawing of FIG. 11, if the left speaker assembly 100*a* is flat, the front plate 131 may not be exposed between the distal end of the first front portion 110*a* and the distal end of the second front portion 120*a*. In this case, the second front elastic member 141 may be in a compressed state, and the first front elastic member 151 may also be in a compressed state.

In addition, when the left speaker assembly 100*a* is flat, the rear plate 132 may not be exposed between the distal end of the first rear portion 110*b* and the distal end of the second rear portion 120*b*. In this case, the second rear elastic member 142 may be in a compressed state, and the first rear elastic member 152 may also be in a compressed state.

Referring to the lower drawing of FIG. 11, when the left speaker assembly 100*a* is in a bent shape, a portion of the front plate 131 may be exposed between the distal end of the first front portion 110*a* and the distal end of the second front portion 120*a*, and may bent convexly. In this case, the second front elastic member 141 and the first front elastic member 151 may assist the sliding movement of the front plate 131 with respect to the second front slot 121'. That is, the second front elastic member 141 may be restored to its initial state and may extend, and may push the front plate 131 in a direction of being separated from the second front slot 121'. In addition, the first front elastic member 151 may be restored to its initial state and may extend, and may push the front plate 131 in a direction of being separated from the first front slot 111'.

In addition, when the left speaker assembly 100*a* is in a bent shape, a portion of the rear plate 132 may be exposed between the distal end of the first rear portion 110*b* and the distal end of the second rear portion 120*b*, and may be convexly bent. In this case, the second rear elastic member 142 and the first rear elastic member 152 may assist the sliding movement of the rear plate 132 with respect to the second rear slot 122'. That is, the second rear elastic member 142 may be restored to its initial state and may extend, and may push the rear plate 132 in a direction of being separated from the second rear slot 122'. In addition, the first rear elastic member 152 may be restored to its initial state and may extend, and may push the rear plate 132 in a direction of being separated from the first rear slot 112'.

Meanwhile, the above-described first and second front elastic members 151 and 141 and the first and second rear elastic members 152 and 142 and their related configurations may identically applicable to the right speaker assembly 100*b* (see FIG. 8).

Accordingly, the speaker assembly 100 may be changed to a more smoothly bent shape, in correspondence with the bending operation of the display device 1. Meanwhile, unlike the above, the speaker assembly 100 may include only the first front elastic member 151 and the first rear elastic member 152 without the second front elastic member 141 and the second rear elastic member 142.

Figure 12:
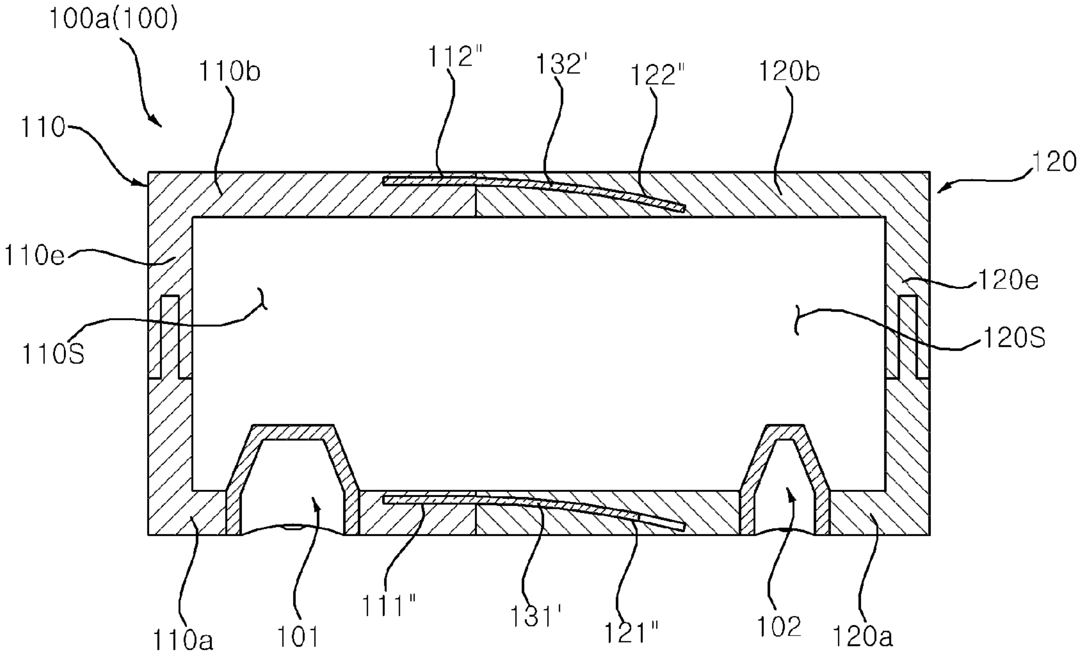
Figure 13:
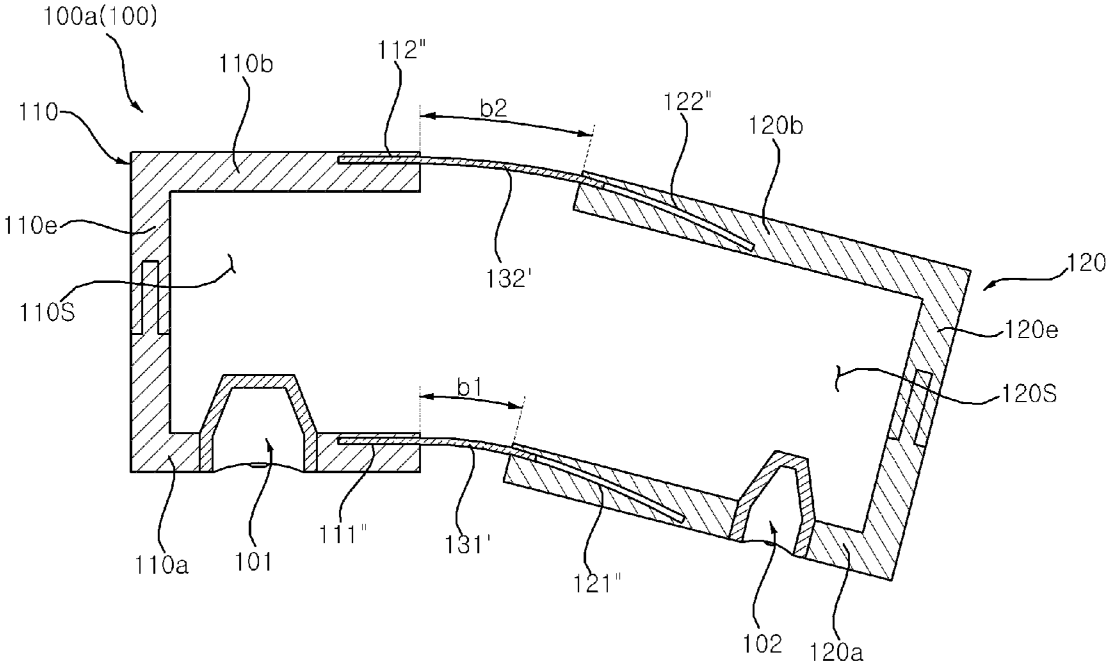

Referring to FIGS. 12 and 13, the first front slot 111" may be formed from the distal end of the first front portion 110*a* toward the inner side of the first front portion 110*a*, and may extend in an arc. The second front slot 121" may be formed from the distal end of the second front portion 120*a* toward the inner side of the second front portion 120*a*, and may extend in an arc. The first front slot 111" and the second front slot 121" may extend in the same arc. The center of the arc may be located on a center of curvature of the display device 1 in a bent state.

The front plate 131' may be convexly bent, and may be inserted into the first front slot 111" and the second front slot 121". The length of the front plate 131' may be equal to or smaller than the sum of the length of the first front slot 111" and the length of the second front slot 121".

Meanwhile, in some embodiments, the first front elastic member 151 (see FIG. 11) and/or the second front elastic member 141 (see FIG. 11) may be provided in the front plate 131'. In this case, the first front elastic member 151 may be disposed between one end of the front plate 131' and the first front slot 111", and the second front elastic member 141 may be disposed between the other end of the front plate 131' and the second front slot 121".

The first rear slot 112" may be formed from the distal end of the first rear portion 110*b* toward the inner side of the first rear portion 110*b*, and may extend in an arc. The second rear slot 122" may be formed from the distal end of the second rear portion 120*b* toward the inner side of the second rear portion 120*b*, and may extend in an arc. The first rear slot 112" and the second rear slot 122" may extend in the same arc. The center of the arc may be located on a center of curvature of the display device 1 in a bent state. In addition, curvatures of the first rear slot 112" and the second rear slot 122" may be smaller than the curvatures of the first front slot 111" and the second front slot 121".

The rear plate 132' may be convexly bent, and may be inserted into the first rear slot 112" and the second rear slot 122". The length of the rear plate 132' may be equal to or smaller than the sum of the length of the first rear slot 112" and the length of the second rear slot 122". In addition, the curvature of the rear plate 132' may be smaller than the curvature of the front plate 131'.

Meanwhile, in some embodiments, the first rear elastic member 152 (see FIG. 11) and/or the second rear elastic member 142 (see FIG. 11) may be provided in the rear plate 132'. In this case, the first rear elastic member 152 may be disposed between one end of the rear plate 132' and the first rear slot 112", and the second rear elastic member 142 may be disposed between the other end of the rear plate 132' and the second rear slot 122".

Referring to FIG. 12, if the left speaker assembly 100*a* is flat, the front plate 131' may not be exposed between the distal end of the first front portion 110*a* and the distal end of the second front portion 120*a*. In addition, when the left speaker assembly 100*a* is flat, the rear plate 132' may not be exposed between the distal end of the first rear portion 110*b* and the distal end of the second rear portion 120*b*.

Referring to FIG. 13, when the left speaker assembly 100*a* is in a bent shape, a portion of the front plate 131' may be exposed between the distal end of the first front portion 110*a* and the distal end of the second front portion 120*a*. In addition, when the left speaker assembly 100*a* is in a bent shape, a portion of the rear plate 132' may be exposed between the distal end of the first rear portion 110*b* and the distal end of the second rear portion 120*b*.

In this case, the length b2 of the portion of the rear plate 132' may be greater than the length b1 of the portion of the front plate 131'. In addition, the curvature of the portion of the rear plate 132' may be smaller than the curvature of the portion of the front plate 131'.

That is, the left speaker assembly 100*a* may be opened in the width direction, and may be bent with respect to the center of curvature of the display device 1, in correspondence with the above-described bending operation of the display device 1. Similarly, the right speaker assembly 100*b* may be opened in the width direction, and may be bent with respect to the center of curvature of the display device 1, in correspondence with the above-described bending operation of the display device 1.

Accordingly, the sound providing direction of the speaker assembly 100 may be toward the ear of a user watching the bent display device 1. That is, compared to a case in which the speaker assembly is disposed in the center of the display device, the speaker assembly 100 may provide a user with an improved sense of presence and high-quality sound, thereby achieving an acoustic lens effect.

In addition, when the speaker assembly 100 is changed from a flat shape (see FIG. 12) to a bent shape (see FIG. 13), the inner space of the speaker assembly 100 may be expanded by the portion of the front plate 131 and the portion of the rear plate 132. That is, the inner space of the speaker assembly 100 may be identical with the sum of the inner space 110S of the first housing 110, the inner space 120S of the second housing 120, and the expansion space 130S'. Accordingly, the reproduction band of the sound provided by the speaker assembly 100 may be expanded, and the sound pressure of the sound may be increased.

Figure 14:
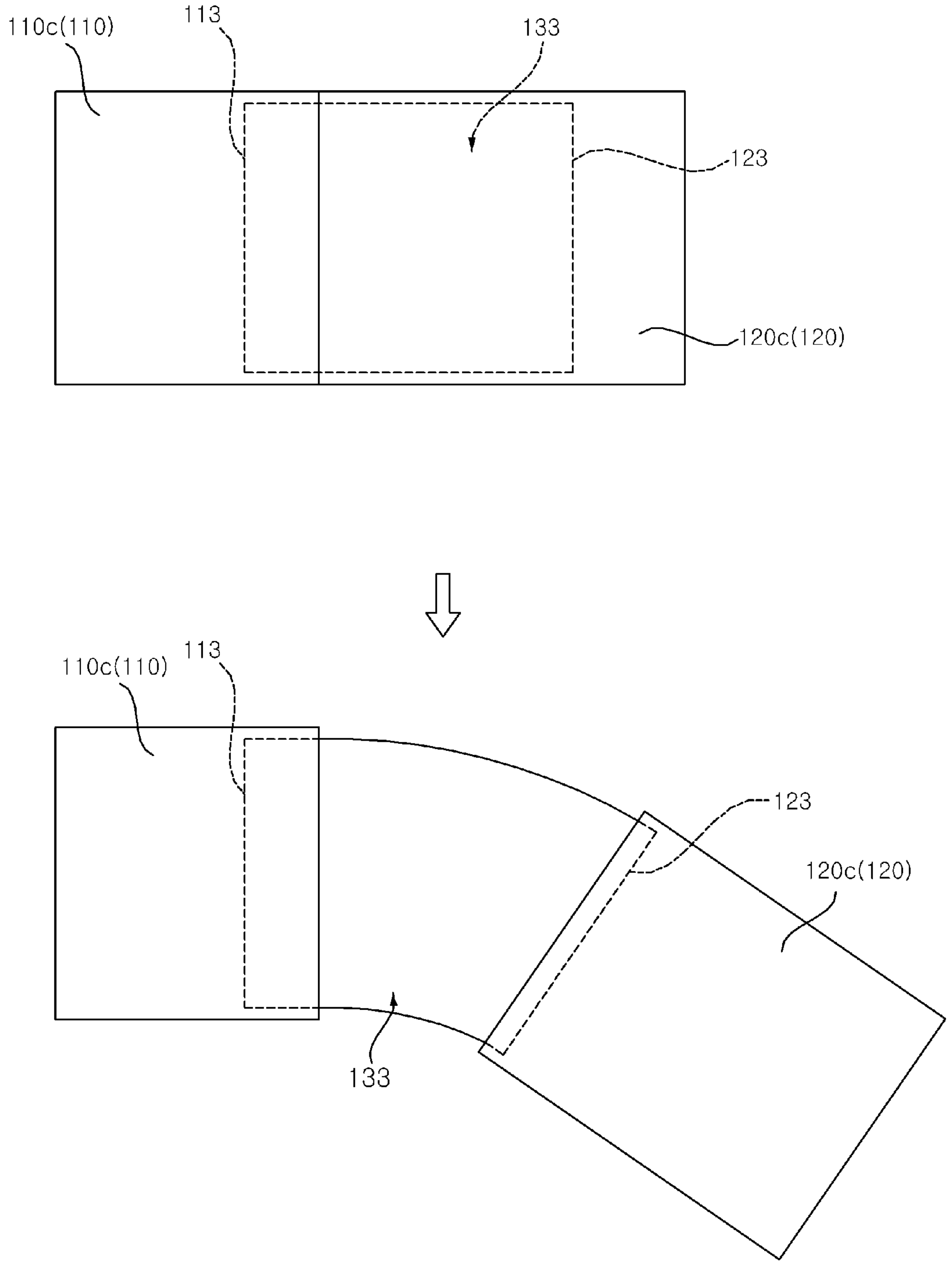

Referring to FIG. 14, a top plate 133 may extend long, and be coupled to the first housing 110 and the second housing 120, between the first housing 110 and the second housing 120. One end of the top plate 133 may be fixed to a first top slot 113 formed in the inner side of the first top portion 110*c* of the first housing 110, and the other end of the top plate 133 may be movably coupled to a second top slot 123 formed in the inner side of the second top portion 120*c* of the second housing 120. That is, the top plate 133 may slide in a direction of being inserted into or separated from the second top slot 123.

Meanwhile, in some embodiments, a first top elastic member (not shown) and/or a second top elastic member (not shown) may be provided in the top plate 133. In this case, the first top elastic member may be disposed between the one end of the top plate 133 and the first top slot 113, and the second top elastic member may be disposed between the other end of the top plate 133 and the second top slot 123.

Referring to the upper drawing of FIG. 14, when the left speaker assembly 100*a* is flat, the top plate 133 may not be exposed between the first housing 110 and the second housing 120.

Referring to the lower drawing of FIG. 14, when the left speaker assembly 100*a* is bent, a portion of the top plate 133 may be exposed between the first housing 110 and the second housing 120. For example, the top plate 133 may be flexible, and the portion of the top plate 133 may be bent. As another example, the top plate 133 may extend in an arc, and the first top slot 113 and the second top slot 123 may extend in an arc, in correspondence with the top plate 133.

Accordingly, the portion of the top plate 133 may define an upper boundary of the expansion space 130S, 130S' (see FIGS. 9 and 13). Meanwhile, the above-described top plate 133 and a configuration related thereto may be identically applied to the right speaker assembly 100*b* (see FIG. 8).

Figure 15:
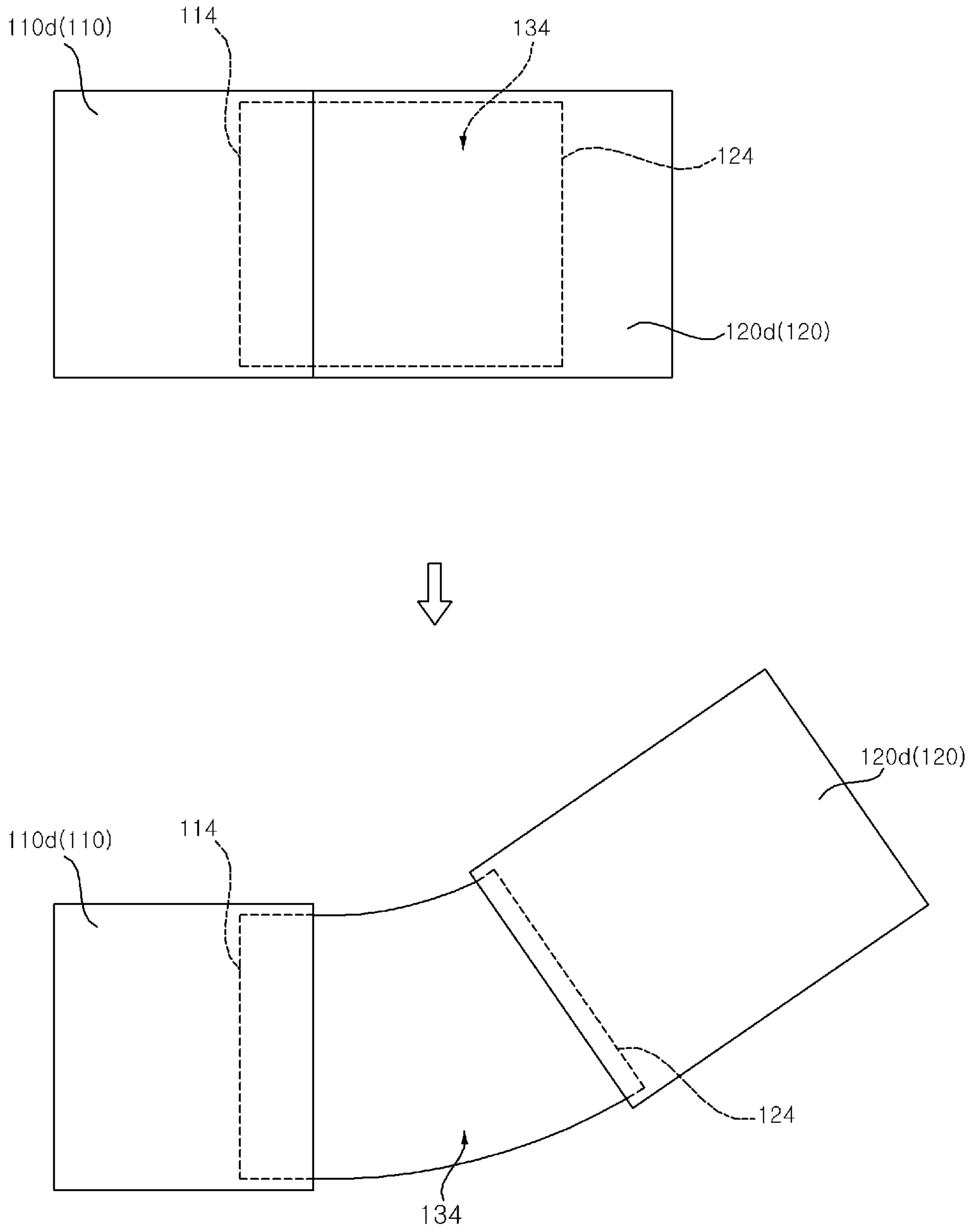

Referring to FIG. 15, a bottom plate 134 may extend long, and may be coupled to the first housing 110 and the second housing 120, between the first housing 110 and the second housing 120. One end of the bottom plate 134 may be fixed to a first bottom slot 114 formed in the inner side of the first bottom portion 110*d* of the first housing 110, and the other end of the bottom plate 134 may be movably coupled to a second bottom slot 124 formed in the inner side of the second bottom portion 120*d* of the second housing 120. That is, the bottom plate 134 may slide in a direction of being inserted into or separated from the second bottom slot 124.

Meanwhile, in some embodiments, the first bottom elastic member (not shown) and/or the second bottom elastic member (not shown) may be provided in the bottom plate 134. In this case, the first bottom elastic member may be disposed between the one end of the bottom plate 134 and the first bottom slot 114, and the second bottom elastic member may be disposed between the other end of the bottom plate 134 and the second bottom slot 124.

Referring to the upper drawing of FIG. 15, when the left speaker assembly 100*a* is flat, the bottom plate 134 may not be exposed between the first housing 110 and the second housing 120.

Referring to the lower drawing of FIG. 15, when the left speaker assembly 100*a* is in a bent shape, a portion of the bottom plate 134 may be exposed between the first housing 110 and the second housing 120. For example, the bottom plate 134 may be flexible, and the portion of the bottom plate 134 may be bent. For another example, the bottom plate 134 may extend in an arc, and the first bottom slot 114 and the second bottom slot 124 may extend in an arc, in correspondence with the bottom plate 134.

Accordingly, the portion of the bottom plate 134 may define a lower boundary of the expansion space 130S, 130S' (see FIGS. 9 and 13). Meanwhile, the above-described bottom plate 134 and a configuration related thereto may be identically applied to the right speaker assembly 100*b* (see FIG. 8).

In addition, the bottom plate 134 may define the boundary of the expansion space 130S, 130S' (see FIGS. 9 and 13) together with the top plate 133 (see FIG. 14), the front plate 131, 131' (see FIGS. 7 and 12), and the rear plate 132, 132' (see FIGS. 7 and 12), and may seal the inner space of the speaker assembly 100.

Referring to FIGS. 1 to 15, provided is a speaker assembly may including: a first housing in which a first speaker is mounted; a second housing in which a second speaker is mounted, and which is adjacent to the first housing; and a plate which protrudes from the first housing toward the second housing, and to which the second housing is movably coupled, wherein a portion of the plate may be bent between the first housing and the second housing, when the second housing moves away from the first housing.

The plate may be extended in a direction intersecting the first housing and the second housing, the first housing may include: a first slot which is formed at a distal end of the first housing, and into which one end of the plate is inserted, and the second housing may include: a second slot which is formed at a distal end of the second housing, and into which the other end of the plate is movably inserted in a length direction of the plate.

The first slot and the second slot may be formed along a straight line, and the plate may be flexible.

The first slot and the second slot may be formed along an arc, and the plate may be convexly formed in correspondence with the arc.

The speaker assembly may further include an elastic member which is located between the other end of the plate and the second slot in a length direction of the plate, and has elasticity, wherein one end of the elastic member may be fixed to the other end of the plate, and the other end of the elastic member may be fixed to the second slot, and the elastic member may be compressed when the second housing approaches the first housing, and may be expanded when the second housing moves away from the first housing.

The speaker assembly may further include an auxiliary elastic member which is located between the one end of the plate and the first slot, in the length direction of the plate, and has elasticity, wherein one end of the auxiliary elastic member may be fixed to the one end of the plate, and the other end of the auxiliary elastic member may be fixed to the first slot, and the auxiliary elastic member may be compressed when the second housing approaches the first housing, and may be expanded when the second housing moves away from the first housing.

An inner space of the first housing may be opened toward the second housing, and an inner space of the second housing may be opened toward the first housing, and may communicate with the inner space of the first housing.

The plate may include: a front plate connected to a front end of the first housing and a front end of the second housing; and a rear plate connected to a rear end of the first housing and a rear end of the second housing, wherein a portion of the front plate may be convexly bent in a rearward direction between the front end of the first housing and the front end of the second housing, and may have a first length and a first curvature, wherein a portion of the rear plate may be convexly bent in a rearward direction between the rear end of the first housing and the rear end of the second housing, and may have a second length greater than the first length and a second curvature less than the first curvature.

The plate may include: a top plate connected to an upper end of the first housing and an upper end of the second housing; and a bottom plate connected to a lower end of the first housing and a lower end of the second housing, wherein the front plate, the rear plate, the top plate, and the bottom plate may seal the inner space of the first housing and the inner space of the second housing, between the first housing and the second housing.

The portion of the plate may define a boundary between the inner space of the first housing and an expansion space communicating with the inner space of the second housing, between the first housing and the second housing.

The first speaker and the second speaker may provide sound in the same direction or a different direction.

Provided is a display device may including: a display panel; a frame to which the display panel is coupled; a left speaker assembly which is adjacent to a left side of the frame, and coupled to the frame; and a right speaker assembly which is adjacent to a right side of the frame, and coupled to the frame, wherein each of the left speaker assembly and the right speaker assembly may include: a first housing in which a first speaker is mounted; a second housing in which a second speaker is mounted, and which is adjacent to the first housing; and a plate which protrudes from the first housing toward the second housing, and to which the second housing is movably coupled, wherein the display panel and the frame may be flexible, and wherein a portion of the plate may be bent between the first housing and the second housing, when the second housing moves away from the first housing.

The left speaker assembly and the right speaker assembly may be coupled to the frame at a lower side of the frame, and may provide a sound in a forward direction.

The second speaker of the left speaker assembly may be closer to the left side of the frame than the first speaker of the left speaker assembly, and may provide a relatively high-pitched sound.

The right speaker assembly may be vertically symmetrical with the left speaker assembly.

The effect of the speaker assembly and the display device having the same according to the present disclosure will be described as follows.

According to at least one of the embodiments of the present disclosure, it is possible to provide a speaker assembly that is convertible from a flat shape to a bent shape.

According to at least one of the embodiments of the present disclosure, it is possible to provide a speaker assembly capable of improving the reproduction range of a speaker by increasing the volume of the speaker in a bent shape.

According to at least one of the embodiments of the present disclosure, it is possible to provide a display device capable of providing a user with a strong sense of screen immersion through a bent display panel, and providing a user with an improved sense of presence and high-quality sound through a bent speaker assembly Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A speaker assembly comprising:

a first housing in which a first speaker is mounted;

a second housing in which a second speaker is mounted, and which is adjacent to the first housing; and a plate which protrudes from the first housing toward the second housing, and to which the second housing is movably coupled, wherein, when the second housing moves away from the first housing, a portion of the plate between the first housing and the second housing is configured to bend, wherein the plate is extended in a direction intersecting the first housing and the second housing, wherein the first housing comprises a first slot which is formed at a distal end of the first housing, and into which a first end of the plate is inserted, and wherein the second housing comprises a second slot which is formed at a distal end of the second housing, and into which a second end of the plate is movably inserted in a length direction of the plate.

2. The speaker assembly of claim 1, wherein the first slot and the second slot are formed along a straight line, and the plate is a flexible.

3. The speaker assembly of claim 1, wherein the first slot and the second slot are formed along an arc, and the plate is convexly formed in correspondence with the arc.

4. The speaker assembly of claim 1, further comprising an elastic member which is located between the second end of the plate and the second slot in a length direction of the plate, and has elasticity, wherein a first end of the elastic member is fixed to the second end of the plate, and a second end of the elastic member is fixed to the second slot, and wherein the elastic member is compressed when the second housing approaches the first housing, and is expanded when the second housing moves away from the first housing.

5. The speaker assembly of claim 4, further comprising an auxiliary elastic member which is located between the first end of the plate and the first slot, in the length direction of the plate, and has elasticity, wherein a first end of the auxiliary elastic member is fixed to the first end of the plate, and a second end of the auxiliary elastic member is fixed to the first slot, and wherein the auxiliary elastic member is compressed when the second housing approaches the first housing, and is expanded when the second housing moves away from the first housing.

6. The speaker assembly of claim 1, wherein an inner space of the first housing is opened toward the second housing, and wherein an inner space of the second housing is opened toward the first housing, and communicates with the inner space of the first housing.

7. The speaker assembly of claim 6, wherein the plate comprises:

a front plate connected to a front end of the first housing and a front end of the second housing; and a rear plate connected to a rear end of the first housing and a rear end of the second housing, wherein a portion of the front plate is convexly bent in a rearward direction between the front end of the first housing and the front end of the second housing, and has a first length and a first curvature, and wherein a portion of the rear plate is convexly bent in a rearward direction between the rear end of the first housing and the rear end of the second housing, and has a second length greater than the first length and a second curvature less than the first curvature.

8. The speaker assembly of claim 7, wherein the plate comprises:

a top plate connected to an upper end of the first housing and an upper end of the second housing; and a bottom plate connected to a lower end of the first housing and a lower end of the second housing, wherein the front plate, the rear plate, the top plate, and the bottom plate seal the inner space of the first housing and the inner space of the second housing, between the first housing and the second housing.

9. The speaker assembly of claim 6, wherein the portion of the plate defines a boundary between the inner space of the first housing and an expansion space communicating with the inner space of the second housing, between the first housing and the second housing.

10. The speaker assembly of claim 1, wherein the first speaker and the second speaker provide sound in the same direction or a different direction.

11. A display device comprising:

a display panel;

a frame to which the display panel is coupled;

a left speaker assembly which is adjacent to a left side of the frame, and coupled to the frame; and a right speaker assembly which is adjacent to a right side of the frame, and coupled to the frame, wherein each of the left speaker assembly and the right speaker assembly comprises:

a first housing in which a first speaker is mounted;

a second housing in which a second speaker is mounted, and which is adjacent to the first housing; and a plate which protrudes from the first housing toward the second housing, and to which the second housing is movably coupled, wherein the display panel and the frame are flexible, and wherein, when the second housing moves away from the first housing, a portion of the plate between the first housing and the second housing is configured to bend, wherein the plate is extended in a direction intersecting the first housing and the second housing, wherein the first housing comprises a first slot which is formed at a distal end of the first housing, and into which a first end of the plate is inserted, and wherein the second housing comprises a second slot which is formed at a distal end of the second housing, and into which a second end of the plate is movably inserted in a length direction of the plate.

12. The display device of claim 11, wherein the left speaker assembly and the right speaker assembly are coupled to the frame at a lower side of the frame, and provide a sound in a forward direction.

13. The display device of claim 11, wherein the second speaker of the left speaker assembly is closer to the left side of the frame than the first speaker of the left speaker assembly, and provides a relatively high-pitched sound as compared to the first speaker of the left speaker assembly.

14. The display device of claim 11, wherein the right speaker assembly is vertically symmetrical with the left speaker assembly.

* * * * *